United States Patent [19]
Shigenobu

[11] Patent Number: 6,072,756
[45] Date of Patent: Jun. 6, 2000

[54] OPTICAL DISK APPARATUS AND DATA RECORDING METHOD

[75] Inventor: Masahiro Shigenobu, Kanagawa, Japan

[73] Assignee: Sony Corporation, Tokyo, Japan

[21] Appl. No.: 09/078,234

[22] Filed: May 13, 1998

[30] Foreign Application Priority Data

May 30, 1997 [JP] Japan .................................. 9-142222

[51] Int. Cl.[7] ...................................................... G11B 7/00
[52] U.S. Cl. ............................................... 369/47; 369/59
[58] Field of Search ................................. 369/47, 48, 59, 369/124, 44.13

[56] References Cited

U.S. PATENT DOCUMENTS 5,815,486  8/1998  Kobayashi et al. ...................... 369/59

*Primary Examiner*—Nabil Hindi
*Attorney, Agent, or Firm*—Frommer Lawrence & Haug, LLP.; William S. Frommer

[57] ABSTRACT

A sync signal is inserted to a signal modulated by RLL (1,7), thereby forming one sector. One cluster is formed by 16 sectors, a preamble, and a postamble. Further, DSV control bits are inserted to data after the modulation. A frequency of recording data concerning the bit number of one cluster after the DSV control bits were inserted is equal to 8.817984 MHz. A frequency of a read clock of the physical address which is previously recorded on an optical disk is equal to 24.192 kHz. By dividing a frequency of 17.635968 MHz into 1/2, a clock signal of a frequency equal to the channel bit frequency can be formed. By dividing it into 1/729, a clock signal of a frequency of a read clock can be formed.

8 Claims, 13 Drawing Sheets

|  | (MSB) | (LSB) |
| --- | --- | --- |
| SY0 | = | 100100000000100000000100X |
| SY1 | = | 100010000000100000000100X |
| SY2 | = | 100001000000100000000100X |
| SY3 | = | 100000100000100000000100X |
| SY4 | = | 100000010000100000000100X |
| SY5 | = | 100100100000100000000100X |
| SY6 | = | 100100010000100000000100X |
| SY7 | = | 100100001000100000000100X |

Fig. 7

|     |                        |     | ABC |   |
|-----|------------------------|-----|-----|---|
| 2T  | XXXXXXX1ABC01XXXXXXX   | →   | 000 |   |
|     | XXXXXX10ABC1XXXXXXXX   | →   | 000 |   |
|     |                        |     |     |   |
| 3T  | XXXXXXX1ABC001XXXXXX   | →   | 000 |   |
|     | XXXXXX10ABC01XXXXXXX   | →   | 000 |   |
|     | XXXXX100ABC1XXXXXXXX   | →   | 000 |   |
|     |                        |     |     |   |
| 4T  | XXXXXXX1ABC0001XXXXX   | →   | 000 |   |
|     | XXXXXX10ABC001XXXXXX   | →   | 000 |   |
|     | XXXXX100ABC01XXXXXXX   | →   | 000 |   |
|     | XXXX1000ABC1XXXXXXXX   | →   | 000 |   |
|     |                        |     |     |   |
| 5T  | XXXXXXX1ABC00001XXXX   | →   | 000 |   |
|     | XXXXXX10ABC0001XXXXX   | →   | 000 |   |
|     | XXXXX100ABC001XXXXXX   | →   | 000 |   |
|     | XXXX1000ABC01XXXXXXX   | →   | 000 |   |
|     | XXX10000ABC1XXXXXXXX   | →   | 000 |   |
|     |                        |     |     |   |
| 6T  | XXXXXXX1ABC000001XXX   | →   | 001 | * |
|     | XXXXXX10ABC00001XXXX   | →   | 101 |   |
|     | XXXXX100ABC0001XXXXX   | →   | 101 |   |
|     | XXXX1000ABC001XXXXXX   | →   | 101 |   |
|     | XXX10000ABC01XXXXXXX   | →   | 101 |   |
|     | XX100000ABC1XXXXXXXX   | →   | 100 | * |
|     |                        |     |     |   |
| 7T  | XXXXXXX1ABC0000001XX   | →   | 001 | * |
|     | XXXXXX10ABC000001XXX   | →   | 101 |   |
|     | XXXXX100ABC00001XXXX   | →   | 101 |   |
|     | XXXX1000ABC0001XXXXX   | →   | 101 |   |
|     | XXX10000ABC001XXXXXX   | →   | 101 |   |
|     | XX100000ABC01XXXXXXX   | →   | 101 |   |
|     | X1000000ABC1XXXXXXXX   | →   | 100 | * |
|     |                        |     |     |   |
| 8T  | XXXXXXX1ABC00000001X   | →   | 001 | * |
|     | XXXXXX10ABC0000001XX   | →   | 101 |   |
|     | XXXXX100ABC000001XXX   | →   | 101 |   |
|     | XXXX1000ABC00001XXXX   | →   | 101 |   |
|     | XXX10000ABC0001XXXXX   | →   | 101 |   |
|     | XX100000ABC001XXXXXX   | →   | 101 |   |
|     | X1000000ABC01XXXXXXX   | →   | 101 |   |
|     | X10000000ABC1XXXXXXX   | →   | 100 | * |

Fig. 8

|     |                      |     | ABC |
|-----|----------------------|-----|-----|
| 2T  | XXXXXXX1ABC01XXXXXX  | →   | 010 |
|     | XXXXXX10ABC1XXXXXXX  | →   | 010 |
| 3T  | XXXXXXX1ABC001XXXXX  | →   | 001 |
|     | XXXXXX10ABC01XXXXXX  | →   | 010 |
|     | XXXXX100ABC1XXXXXXX  | →   | 100 |
| 4T  | XXXXXXX1ABC0001XXXX  | →   | 001 |
|     | XXXXXX10ABC001XXXXX  | →   | 010 |
|     | XXXXX100ABC01XXXXXX  | →   | 010 |
|     | XXXX1000ABC1XXXXXXX  | →   | 100 |
| 5T  | XXXXXXX1ABC00001XXX  | →   | 001 |
|     | XXXXXX10ABC0001XXXX  | →   | 001 |
|     | XXXXX100ABC001XXXXX  | →   | 010 |
|     | XXXX1000ABC01XXXXXX  | →   | 100 |
|     | XXX10000ABC1XXXXXXX  | →   | 100 |
| 6T  | XXXXXXX1ABC000001XX  | →   | 001 |
|     | XXXXXX10ABC00001XXX  | →   | 001 |
|     | XXXXX100ABC0001XXXX  | →   | 010 |
|     | XXXX1000ABC001XXXXX  | →   | 010 |
|     | XXX10000ABC01XXXXXX  | →   | 100 |
|     | XX100000ABC1XXXXXXX  | →   | 100 |
| 7T  | XXXXXXX1ABC0000001X  | →   | 001 |
|     | XXXXXX10ABC000001XX  | →   | 001 |
|     | XXXXX100ABC00001XXX  | →   | 001 |
|     | XXXX1000ABC0001XXXX  | →   | 010 |
|     | XXX10000ABC001XXXXX  | →   | 100 |
|     | XX100000ABC01XXXXXX  | →   | 100 |
|     | X1000000ABC1XXXXXXX  | →   | 100 |
| 8T  | XXXXXXX1ABC00000001  | →   | 001 |
|     | XXXXXX10ABC0000001X  | →   | 001 |
|     | XXXXX100ABC000001XX  | →   | 001 |
|     | XXXX1000ABC00001XXX  | →   | 010 |
|     | XXX10000ABC0001XXXX  | →   | 010 |
|     | XX100000ABC001XXXXX  | →   | 100 |
|     | X1000000ABC01XXXXXX  | →   | 100 |
|     | 10000000ABC1XXXXXXX  | →   | 100 |

OPTICAL DISK APPARATUS AND DATA RECORDING METHOD

BACKGROUND OF THE INVENTION

1. Field of the Invention

The invention relates to optical disk apparatus and data recording method, in which physical address information is previously recorded on an optical disk and by reproducing the address information, data can be recorded at a predetermined position of the optical disk.

2. Description of the Related Art

In an optical disk apparatus such as a magnetooptic disk apparatus or the like, a physical address corresponding to a position on a disk is previously recorded on the disk, the address is reproduced, and data is recorded at a predetermined position. The physical address has previously been recorded on the optical disk by an unrewritable method different from a recording/reproducing method of data. For example, an address area is provided in a track and address information is recorded by pits formed in the address area by an embossing work.

There is also a method of recording a physical address as information of wobbling grooves formed on the disk. For example, in a mini disk (MD), in case of wobbling the grooves, the information of the physical address is superimposed by modulating a sine wave signal for wobbling. A detection of a tracking error and a control of a spindle motor are enabled by the wobbling grooves and, further, the physical addresses are recorded onto the whole disk.

In the MD in which the physical addresses are recorded by the wobbling grooves mentioned above, a value of a frequency of a clock signal necessary for a modulating process of data and a value of a frequency of a clock signal necessary for a reproducing process of the physical address are separately determined, so that there is a problem such that a construction to generate those clock signals is complicated.

OBJECTS AND SUMMARY OF THE INVENTION

It is, therefore, an object of the invention to provide optical disk apparatus and data recording method which can easily generate a clock signal for a data process and a clock signal for a physical address reproducing process.

To accomplish the above problem, according to the invention, there is provided an optical disk apparatus in which address information is previously recorded and data is recorded to an address shown by the address information, characterized in that the apparatus comprises:

a modulating unit for converting recording data into a data structure having a predetermined format and modulating data having the predetermined format;

a recording unit for recording the recording data from modulating unit onto an optical disk; and an address reproduction processing unit for reproducing the address information from a reproduction signal from the optical disk, and that in the modulating unit, the number of bits of DSV control bits which are inserted into the modulation data is set so that a ratio between a frequency of a first clock signal which is used in address reproduction processing unit and a frequency of a second clock signal which is used in the modulating unit is equal to an integer ratio.

According to the invention, there is provided a data recording method of previously recording address information and recording data to an address shown by the address information, characterized in that the method comprises:

a step of converting recording data into a data structure having a predetermined format and modulating data having the predetermined format;

a step of recording the recording data generated by the modulation onto an optical disk; and a step of an address reproducing process for reproducing the address information from a reproduction signal from the optical disk, and that in the data modulating step, the number of bits of DSV control bits which are inserted into the modulation data is set so that a ratio between a frequency of a first clock signal which is used in the address reproduction processing step and a frequency of a second clock signal which is used in the modulating step is equal to an integer ratio.

As mentioned above, since the frequency of the first clock signal which is necessary in the address reproducing process and the frequency of the second clock signal which is necessary in the modulating process for generating the recording data are set to the relation of an integer ratio, the construction for generating the first and second clock signals can be simplified.

The above, and other, objects, features and advantage of the present invention will become readily apparent from the following detailed description thereof which is to be read in connection with the accompanying drawings.

BRIEF DESCRIPTION OF THE DRAWINGS

FIG. 7 is a schematic diagram showing a table which is used when the DSV bits are added;

FIG. 8 is a schematic diagram showing a table which is used when the DSV bits are added;

DETAILED DESCRIPTION OF THE PREFERRED EMBODIMENTS

Figure 1:
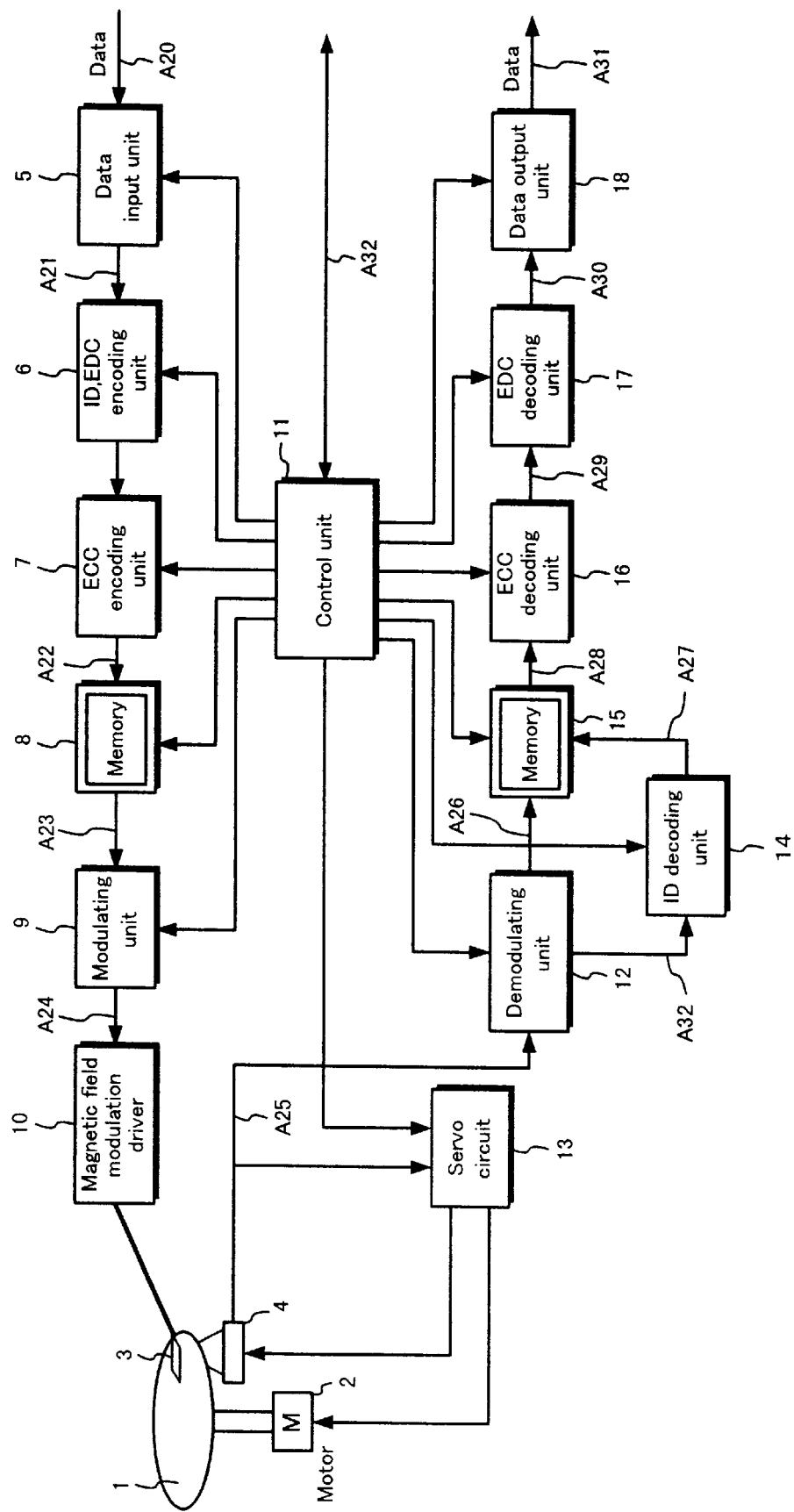
FIG. 1 is a block diagram showing a whole construction according to an embodiment of the invention.

An embodiment of the invention will be described hereinbelow with reference to the drawings. A whole construction of an apparatus when a magnetooptic disk is used as an optical disk is shown in FIG. 1. In FIG. 1, reference numeral 1 denotes a magnetooptic disk. The magnetooptic disk (hereinbelow, simply called a disk) 1 is rotated by a spindle motor 2 at CLV (constant linear velocity). On the disk 1, in a manner similar to an MD, grooves for tracking error detection and for CLV control and wobbling grooves are preliminarily formed.

Digital data is recorded onto the disk 1 by, for example, a magnetic field modulating method. For this purpose, a magnetic head 3 for recording is provided near the disk 1. In order to reproduce the digital data and information on the wobbling grooves from the disk 1, an optical system 4 is provided. Further, although not shown, a feeding mechanism for moving a recording/reproducing position in the radial direction of the disk 1 is provided.

User data A20 to be recorded from an external block, for example, a computer is supplied to a data input unit 5. Output data A21 of the data input unit 5 is supplied to an ID-EDC (error detection code) encoding unit 6. In the ID-EDC encoding unit 6, an ID to be added to the recording data and an EDC signal (for example, a CRC code) for checking an error of reproduction data at the time of reproduction are added to the digital data.

An output of the ID-EDC encoding unit 6 is supplied to an ECC (error correction code) encoding unit 7 and is error correction encoded. As an error correction code, for example, a CIRC (cross interleaved Reed Solomon code) can be used. In the ECC encoding unit 7, data A22 to which a parity of the error correction code is added is once stored in a memory 8. The memory 8 once stores the data A22 which was transferred from the external block and processed and outputs data A23 of a time base adapted to the recording to a modulating unit 9.

The modulating unit 9 receives the data A23 to be recorded as an example, converts to a data structure of a sector and a cluster, and also executes an RLL (1, 7) modulation. The modulated data is supplied as recording data to a magnetic field modulation driver 10. The magnetic field modulation driver 10 drives the magnetic head 3. The magnetic head 3 generates a magnetic field for recording and the data is recorded onto the disk 1.

The construction and operation of a reproducing system will now be described. The optical system 4 irradiates a laser beam onto the disk 1, receives the reflected light which occurs accordingly, and outputs a reproduction signal A25. The reproduction signal A25 is supplied to a demodulating unit 12 and a servo circuit 13. The servo circuit 13 controls the optical system 4, spindle motor 2, and a feeding mechanism (not shown) so as to set the reproduction signal A25 into a proper state. That is, the servo circuit 13 has functions of a tracking servo, a focusing servo, a thread servo, and a CLV servo and executes a reproducing process of physical address information as will be described hereinlater.

For the reproduction signal supplied to the demodulating unit 12, processes opposite to those in the modulating unit 9, that is, a demodulation of RLL (1, 7) and a decomposition of a data format are performed. A demodulated signal A32 is sent to an ID decoding unit 14, a demodulated signal A26 is sent to a memory 15, and the signal A26 is once stored in the memory 15. The ID decoding unit 14 detects the ID added by the ID-ECC encoding unit 6 from the demodulation signal A32. An address A27 for storing the demodulated signal A26 into the memory 15 is determined on the basis of the detected ID signal. The address A27 is an address different from a physical address corresponding to a position on the disk.

A signal A28 read out from the memory 15 is supplied to an ECC decoding unit 16 and an error correcting process is executed. For example, a decoding process of the CIRC is performed. Error corrected data A29 from the ECC decoding unit 16 is supplied to an EDC decoding unit 17. In the EDC decoding unit 17, for example, by using a CRC, a check is made to see whether the error corrected data A29 is correct or not. This is executed to check an erroneous correction (that is, the error is overlooked and it is determined that the data is correct) in the error correcting process. Output data A30 of the EDC decoding unit 17 is supplied to a data output unit 18 and is transferred as reproduction data to the external block.

Reference numeral 11 denotes a control unit for controlling the whole apparatus. For example, the control unit 11 is constructed by a microcomputer. The control unit 11 executes encoding/decoding processes, modulating/demodulating processes, writing/reading processes for the memory, inputting/outputting processes of data, control of the servo circuit, and the like in the above-mentioned recording system. Those controls are executed on the basis of a communication (shown by A32) with the external block.

As mentioned above, the modulating unit 9 performs a process for formatting the data to be recorded to data having a sector and cluster structure besides the modulating process of RLL (1, 7). The processes in the modulating unit 9 will now be described in detail hereinbelow.

RLL (1, 7) which is executed by the modulating unit 9 is one of the RLL (Run Length Limited) encoding methods for limiting the run length, that is, the number of '0' between '1' and '1'. Generally, an m/n block code in which the minimum number of '0' between '1' and '1' is equal to (d) and the maximum number is equal to (k) is called RLL (d, k; m, n). A block encoding method of converting an information word of two bits to a cord word of three bits, setting the minimum number of '0' between '1' and '1' to one, and setting the maximum number to seven is RLL (1, 7; 2, 3). Generally, RLL (1, 7; 2, 3) is simply called an RLL (1, 7) code.

In case of executing a process of NRZI to the signal modulated by RLL (1, 7), the minimum inversion interval of the processed data is equal to 2T (T: one clock period) and the maximum inversion interval is equal to 8T. Further, when (m) bits of the information word are modulated to (n) bits of the code word, each of the (n) bits of the code word is called a channel bit. The modulation of RLL (1, 7) is a process for generating channel bits of three bits by referring to two bits of the present input data, one or two bits of next input data, and a previous channel bit (one bit).

Figures 2, 3:
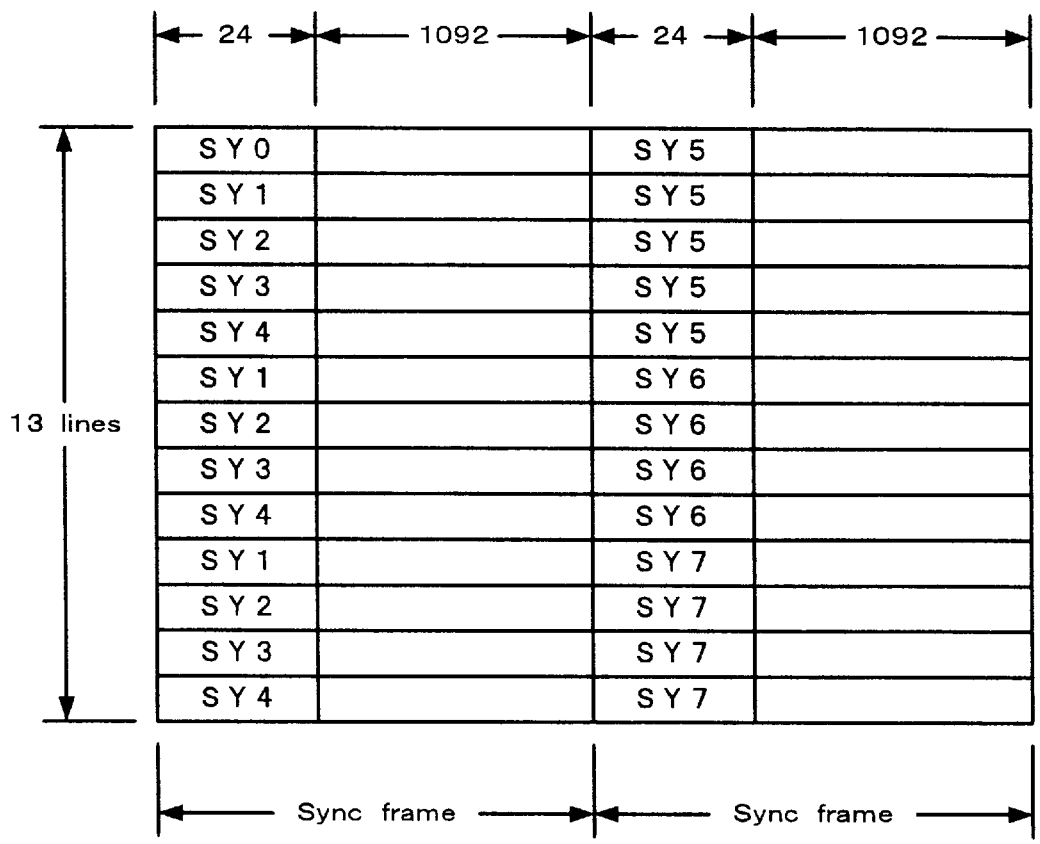
FIG. 2 is a schematic diagram for explaining a data construction of one sector.
FIG. 3 is a schematic diagram showing an example of a sync signal which is inserted to the head of a sync frame.

A modulation signal modulated by RLL (1, 7) is converted to the sector structure. That is, as shown in FIG. 2, the modulation signal is separated every 1092 channel bits and sync signals SY0 to SY7 each having 24 channel bits are inserted therebetween. The sync signal and the subsequent 1092 channel bits are called one sync frame. By collecting 13 rows (26 sync frames) in each of which two sync frames are arranged, one sector is constructed. Consequently, one sector consists of (24×2+1092×2)×13=2232×13=29,016 channel bits. The sync signal SY0 is added only to the head sync frame of the sector.

FIG. 2 shows the number of channel bits after the modulation. Before the modulation, 1092 channel bits correspond to 728 data bits (=91 bytes). Data of 182 bytes is accordingly included in one line and data of (182×13=2,366 bytes: about 2k bytes) is included in one sector. Since a sync signal corresponds to 16 data bits=2 bytes, data of (186×13=2,418 bytes) is included in the whole one sector including the sync signals. It corresponds to 3,627 channel bits.

An example of bit patterns of the sync signals SY0 to SY7 is shown in FIG. 3. In FIG. 3, (x) denotes that any one of '0' and '1' can be used. As will be understood from the fact that the number of '0' between '1' and '1' is equal to eight (that is, an inversion interval of 9T), those are bit patterns which are not generated by the modulation of RLL (1, 7). Since accuracy of a signal demodulation is requested, the sync signal needs to be strong against an error as compared with the other signals. The bit patterns of the sync signals shown in FIG. 3 are selected so as to obtain good error resistive characteristics.

According to RLL (1, 7), although a signal having an inversion interval of 2T to 8T can exist as mentioned above, in case of the reproduction signal from the disk, since a reproduction signal amplitude of a signal having a high frequency is not sufficiently large due to characteristics of the optical system, an error easily occurs in a signal of 2T having the highest frequency. It is prevented that an inversion interval of 2T exists in the sync signals SY0 to SY7, thereby making it different to cause an error.

As mentioned above, the sync signals SY0 to SY7 include the signal of 9T which does not exist in the RLL (1, 7) modulation signal and the inversion intervals of 9T are aligned between the sync signals. When an error occurs in the signals other than the portion of 9T, therefore, the reproduction signal can be again synchronized at '1' of 9T.

Further, in the structure of one sector shown in FIG. 2, a set of the sync signals SY0 to SY4 added to the sync frame on the left side of the diagram includes four '1' and a set of the sync signals SY5 to SY7 added to the sync frame on the right side includes five '1'. By making the numbers of '1' included in the sync signals different, a set of the sync signals can be easily discriminated for an error such that the position of '1' having the highest frequency is deviated in the signal from the disk. Further, the sync signal has a length of 24 channel bits. When the length is converted to the data length before modulation, it has a value which is integer times as long as two bytes. Consequently, a construction of the modulating/demodulating circuit can be set to a processing construction of a byte unit.

Figure 4:
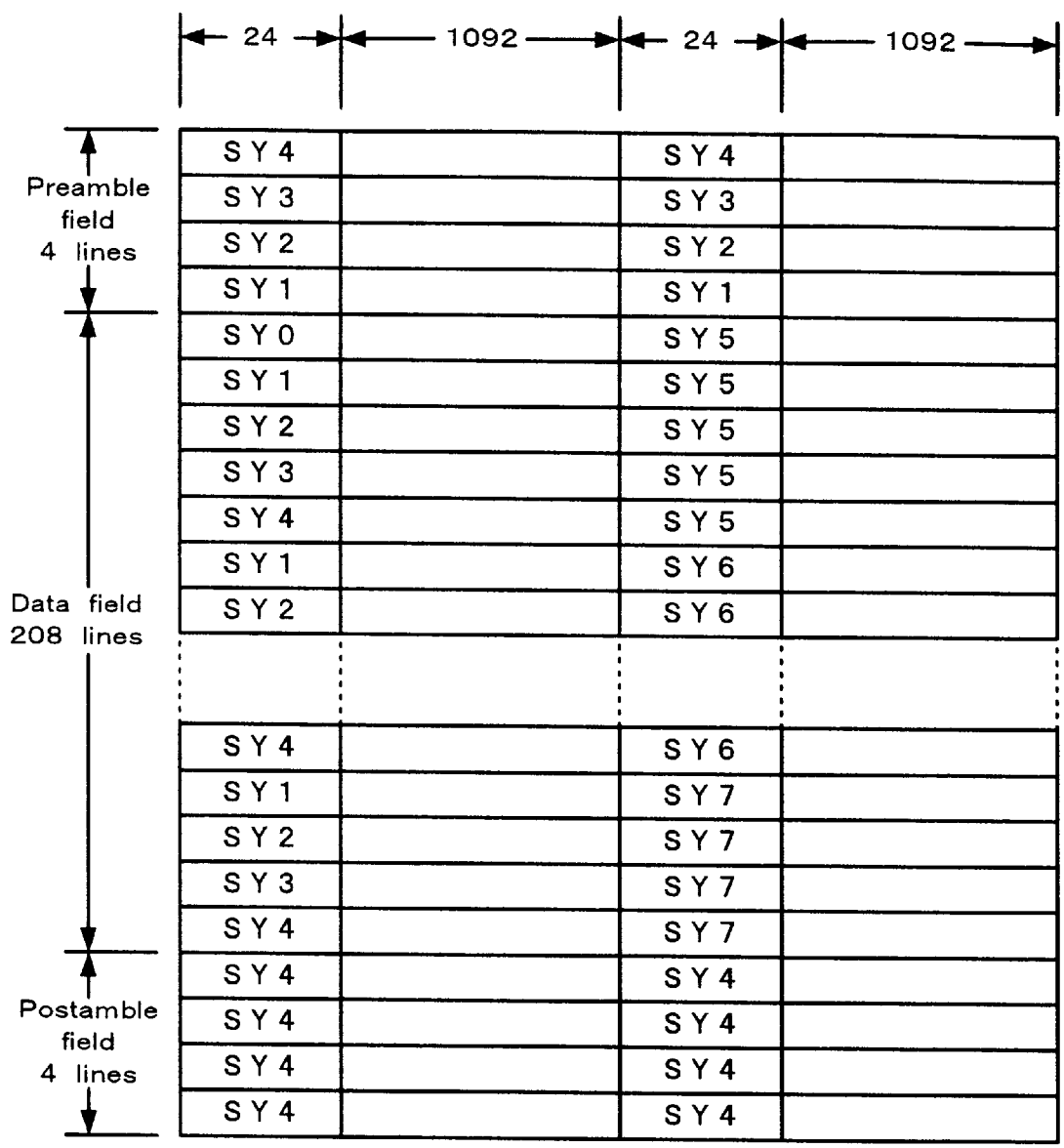
FIG. 4 is a schematic diagram for explaining a data structure of one cluster as a recording/reproducing unit.

One cluster is constructed by the above-mentioned 16 sectors, a preamble, and a postamble. One cluster is a data unit of recording/reproduction (rewriting). FIG. 4 shows a structure of one cluster. As will be described hereinlater, a cluster after bits for DSV control were added is called a cluster (2) and a cluster (FIG. 4) which does not include the bits for DSV control is called a cluster (1). Since one sector consists of 13 lines (one line includes two sync frames), (13×16=208 lines) are set to a data field. A preamble field of four lines is added before the data field and a postamble field of four lines is added after the data field. Consequently, a size of one sector is equal to (208+4×2=216 lines)×2 sync frames. The sync signals of the preamble start from SY4 and sequentially change like SY3, SY2, and SY1. The sync signal of the post amble is always SY4. Known predetermined data is inserted into the preamble and the postamble and is subjected to the modulating process in a manner similar to the data field.

Bits for DSV (Digital Sum Value) control are added to the signal modulated by RLL (1, 7). The DSV is a value in which the bit of '1' is set to +1 and the bit of '0' is set to −1. To converge the DSV obtained by accumulating the bit streams of the modulated data to 0 or a value close to 0 is a function of the DSV control bits (called DSV bits). The DSV bits are inserted into the modulated data stream on a 3-bit unit basis.

Figure 5:
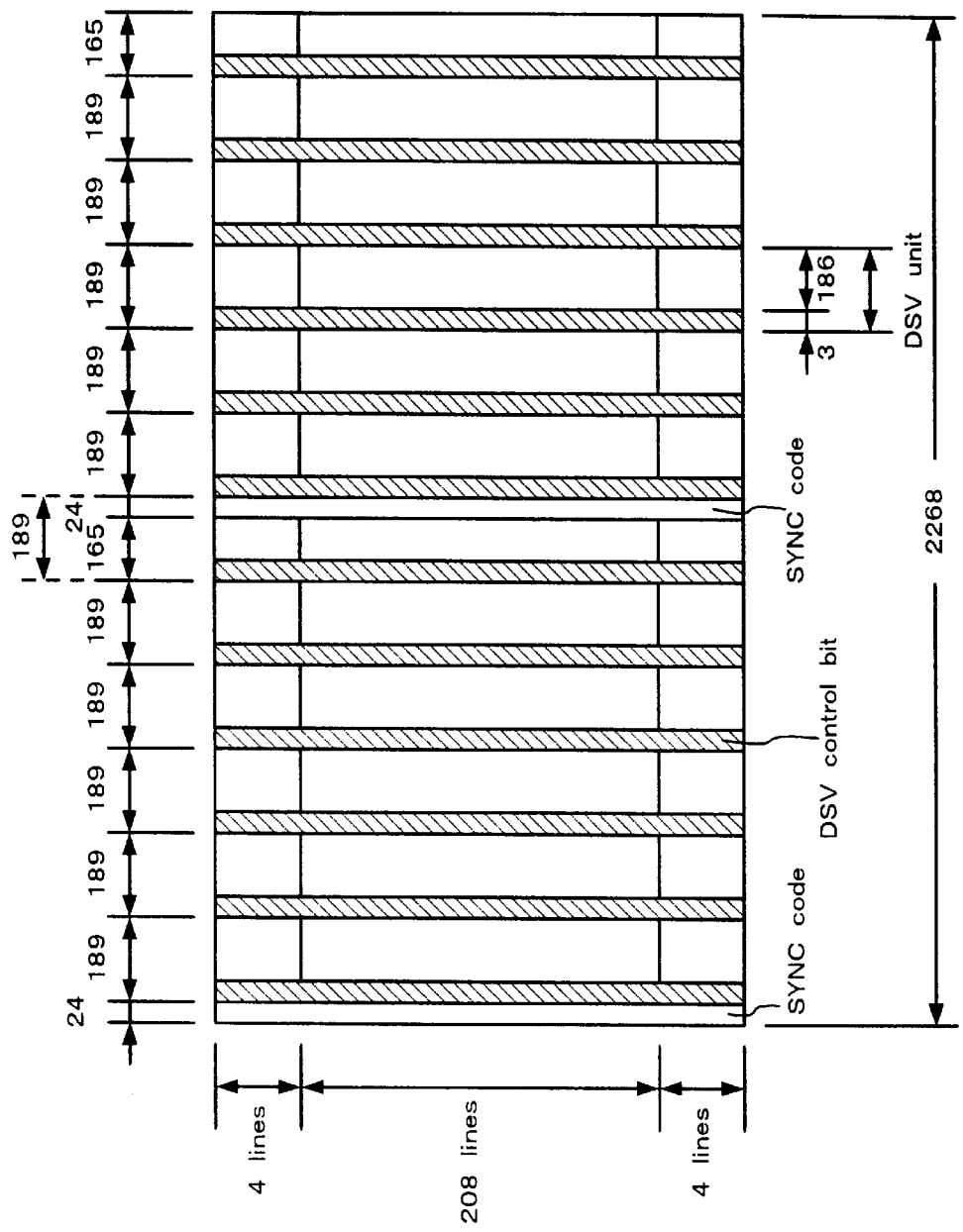
FIG. 5 is a schematic diagram for explaining a data structure of one cluster to which DSV bits are added.

FIG. 5 shows a structure of the cluster (2) in which the DSV bits were added to the above-mentioned one cluster (1). In FIG. 5, hatched regions show the inserted DSV bits. The DSV bits (three bits) are inserted to the modulated data of each line at predetermined intervals. One line includes two sync frames (two sync signals). It is unpreferable that the pattern of the sync signal changes as a result of the insertion of the DSV bits. In the example shown in FIG. 5, the DSV bits (three bits) are inserted just after the first sync signal of each line. Subsequently, the DSV bits (three bits) are inserted after an interval of 186 channel bits. This method is repeated and the DSV bits (three bits) are sequentially inserted at total 12 places of the respective lines. Consequently, the DSV bits are positioned not only just after the first sync signal of each line but also just after the second sync signal. After eliminating the DSV bits from the reproduction signal from the disk, the demodulating process is executed. Since a deviation of synchronization is small just after the sync signal, the DSV bits can be certainly eliminated. A length of 189 bits constructed by the DSV bits of three bits and the data of 186 bits is called a DSV unit.

In the cluster (2), the sync signal of 24 channel bits is positioned at the head of one line, eleven DSV units each having 189 channel bits follow after that, and 165 bits are positioned at the last. (24+189×11+165=2268 channel bits) are, therefore, included in one line. The last 165 bits are used to construct a DSV unit together with a sync signal (24 channel bits) at the head of the next line. The total number of channel bits of the cluster (2) into which the DSV bits are inserted is calculated as (2268×216=489,888 channel bits). As will be described hereinlater, a channel bit frequency corresponding to the above-mentioned size of the cluster (2) is well matched with the frequency of a clock signal which is necessary for a reproducing process of a physical address.

Figure 6:
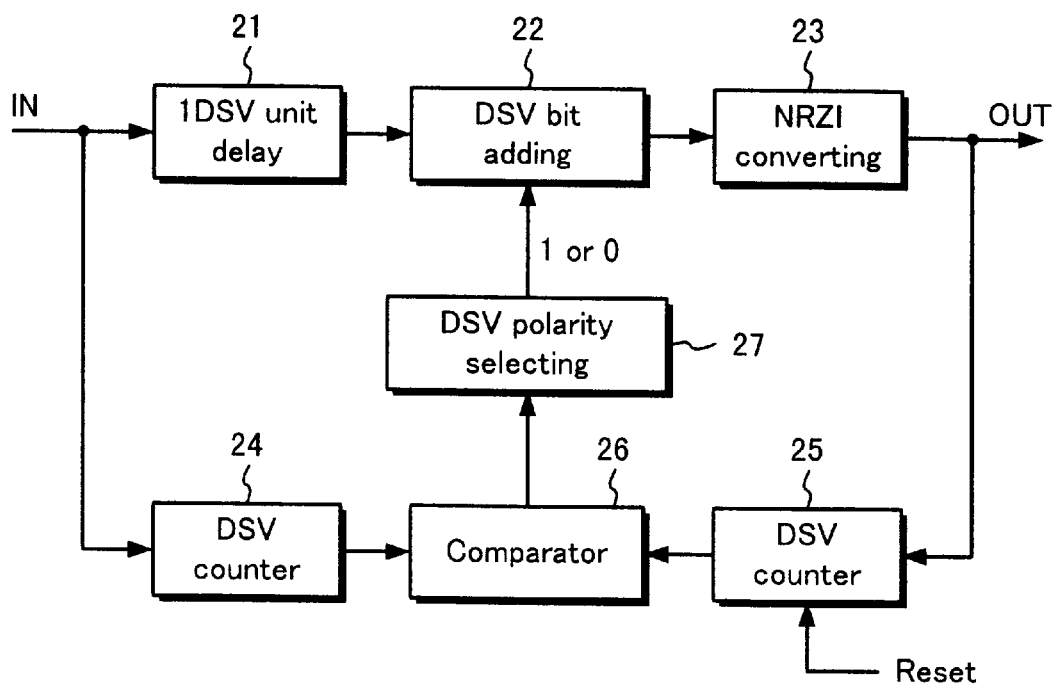
FIG. 6 is a block diagram showing an example of a construction to add the DSV bits.

FIG. 6 shows a construction which is included in the modulating unit 9 and is used to insert the DSV bits. The input data modulated by RLL (1, 7) is supplied to a LDSV unit (189 channel bits) delay 21 and a DSV counter 24. An output of the LDSV unit delay 21 is supplied to a DSV bit adding circuit 22. An output of the adding circuit 22 is supplied to an NRZI converting circuit 23. Output data including the DSV bits is extracted from the NRZI converting circuit 23. When data of '1' is supplied, the NRZI converting circuit 23 inverts the output signal. When data of '0' is supplied, the circuit 23 doesn't invert the output signal. Output data of the NRZI converting circuit 23 is recorded on the disk.

The output data is supplied to a DSV counter 25. A reset signal is supplied to the DSV counter 25. By the reset signal, a resetting operation is executed only in the preamble field of the cluster (2). In the other fields, the resetting operation is not executed but the DSVs are successively accumulated. In case of recording data for the continuous clusters, it is sufficient to execute the resetting operation once at the start of the recording. In case of the continuous recording, the resetting operation is unnecessary. For example, when the output data is equal to '1', the DSV counter 25 executes the counting operation of '+1'. When the output data is equal to '0', the counter executes the counting operation of '−1'. The DSV counter 24 to which the input data is supplied also executes the counting operation similar to that of the DSV counter 25 every 1DSV unit.

The DSV counter 24 generates an accumulation value of the DSV of the 1DSV unit of the input data. Since the 1DSV unit delay 21 is provided, the DSV counter 25 generates an accumulation value of the DSVs of the output data up to the one-preceding DSV unit. Those accumulation values of the DSVs are compared by a comparator 26. A DSV polarity selecting circuit 27 is controlled by a comparison result of the comparator 26. A polarity selection signal of one bit for instructing a polarity of the DSV to be added is generated from the DSV polarity selecting circuit 27. '0' of the polarity selection signal indicates a case where '1' of the number of 0 or 2 should be included in the DSV bits of 3 bits (namely, the modulation waveform is not inverted). '1' of the polarity selection signal indicates a case where one '1' should be included in the DSV bits (namely, the modulation waveform is inverted). With reference to the polarity selection signal, the DSV bit adding circuit 22 adds the DSV bits.

FIGS. 7 and 8 show tables of a conversion rule of the addition of the DSV bits which is performed in the DSV bit adding circuit 22. FIG. 7 shows the table when the polarity selection signal is equal to '0'. FIG. 8 shows the table when the polarity selection signal is equal to '1'. In FIGS. 7 and 8, 2T to 8T denote inverting intervals of the position where the DSV bits of the input data modulated by RLL (1, 7) are inserted. Three bits shown by "ABC" denote the DSV bits which are actually inserted. In FIGS. 7 and 8, "x" denotes that any one of '0' and '1' can be used. "*" in FIG. 7 denotes a case where the DSV cannot be controlled. As patterns of 3 bits in the DSV bits, (000), (001), (010), (100), and (101) are used.

The physical addresses which have previously been formed on the disk will now be described. As an example, guide grooves for tracking control have previously been formed on the disk. The guide grooves have been wobbled by a sine wave signal of a predetermined frequency (for example, 84.672 kHz) for controlling the rotation of the spindle motor. Further, a carrier signal of such a frequency is frequency modulated by address information, thereby recording the address information to the guide grooves. The address information which is recorded by such a method is called an ADIP (Address In Pre-groove). The address starts from 0000h (h denotes a hexadecimal notation) and monotonously increases in the information area of the disk.

Figure 9:
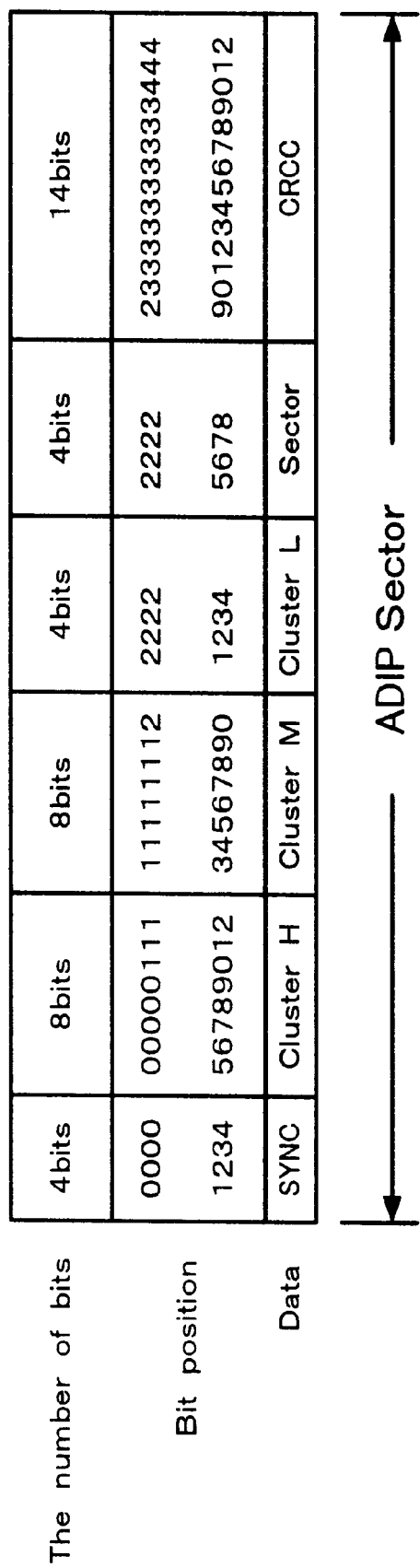
FIG. 9 is a schematic diagram for explaining a data structure of one sector of a physical address.

FIG. 9 shows a construction of one sector (ADIP sector) of ADIP. The sector comprises: a sync signal of 4 bits; a cluster address (cluster H) of 8 bits; a cluster address (cluster M) of 8 bits; a cluster address (cluster L) of 4 bits; a sector address of 4 bits; and a CRC code for error detection of the cluster addresses and sector address. The cluster H, cluster M, and cluster L denote upper, middle, and lower addresses of the cluster addresses. Bit positions of (01) to (42) are specified for 42 bits of one sector shown in FIG. 9.

Figure 10A:
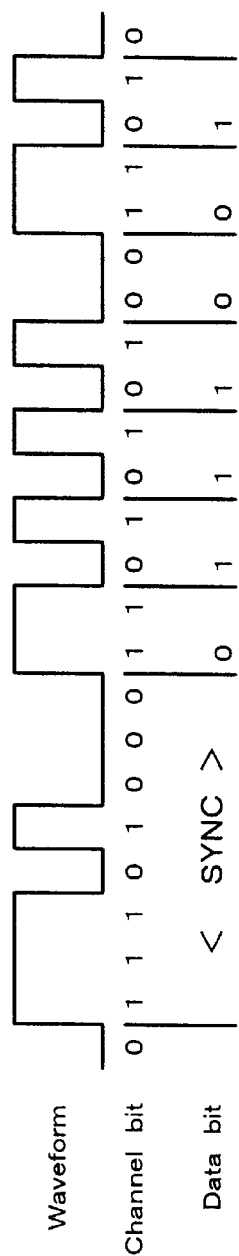
FIGS. 10A and 10B are schematic diagrams for explaining a modulating method of the physical address.
Figure 10B:
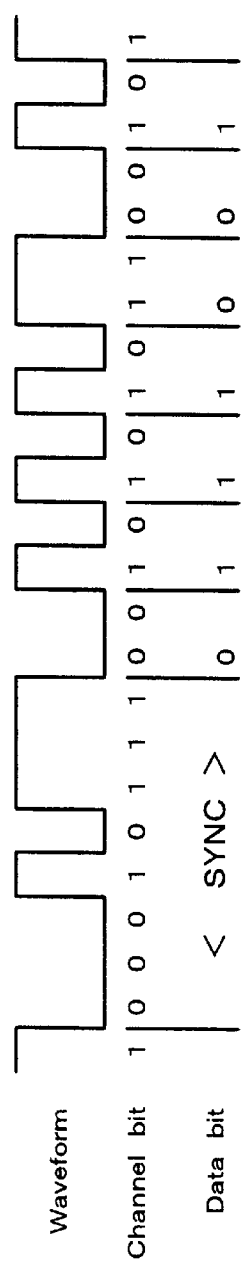

Data having the above-mentioned ADIP sector structure is modulated by a bi-phase mark. FIGS. 10A and 10B show an example and another example of the sync signal. In the example of FIG. 10A, the sync signal has a pattern of 8 channel bits of (11101000) and data which was bi-phase modulated subsequently follows. The data is obtained in a manner such that '0' of the data bit is converted to 2 bits serving as channel bits of (00) or (11) and '1' is converted to 2 bits serving as channel bits of (01). The pattern of the sync signal in FIG. 10A is used when the channel bit just before the sync signal is equal to '0'. When the channel bit just before the sync signal indicates '1', as shown in FIG. 10B, the sync signal of a pattern of (00010111) is used.

Figure 11:
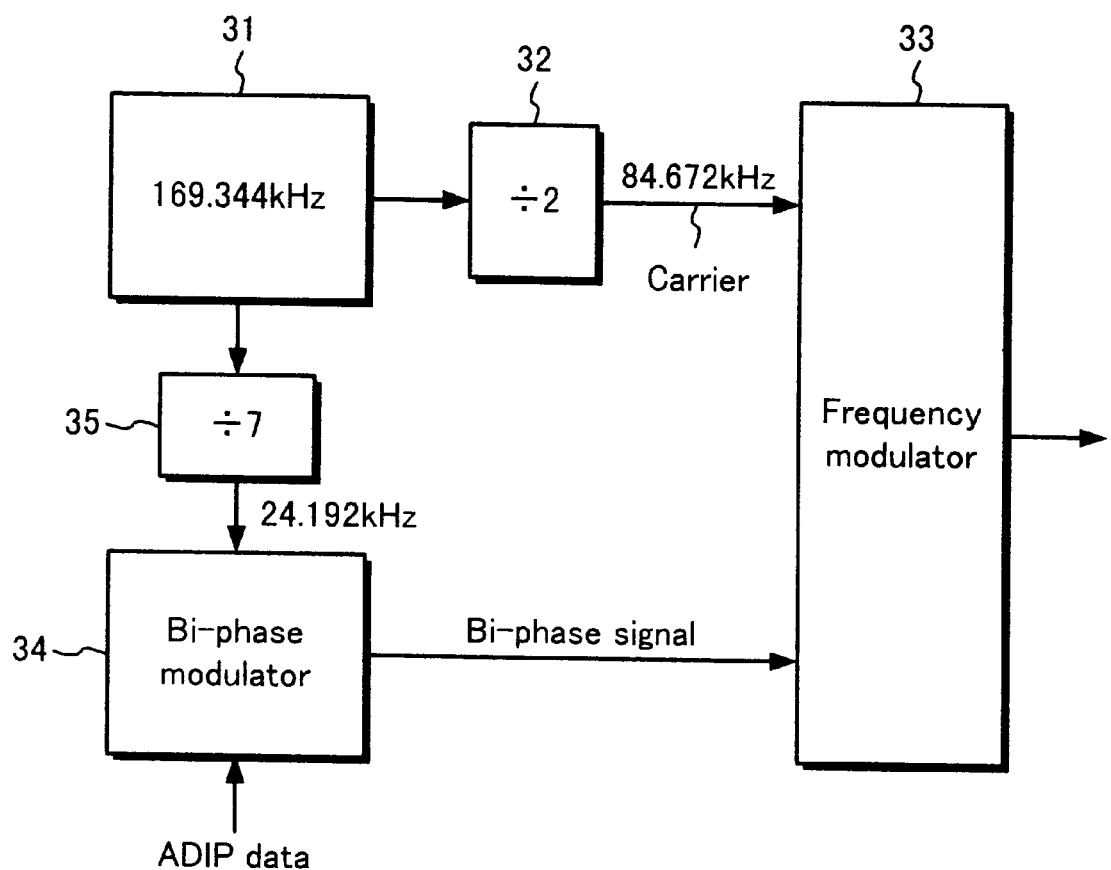
FIG. 11 is a block diagram showing an example of a construction in case of recording the physical address as pregrooves.

The bi-phase modulated ADIP data is analog frequency modulated. FIG. 11 shows an example of an encoder which is used when the wobbling grooves are previously formed on the disk. In FIG. 11, reference numeral 31 denotes a stable oscillator such as a crystal oscillator or the like. The oscillator 31 generates a signal of 169.344 kHz. An output of the oscillator 31 is supplied to a 1/2 frequency divider 32. A carrier signal of 84.672 kHz is generated in its output. The carrier signal is a wobbling frequency of the grooves which are spirally formed on the disk. The carrier signal is supplied to an FM modulator 33.

On the other hand, the ADIP data having the sector structure shown in FIG. 9 is supplied to a bi-phase modulator 34. A bi-phase clock of 24.192 kHz obtained by frequency dividing the output of the oscillator 31 by a frequency divider 35 is supplied to the modulator 34. The bi-phase clock is a clock to read out each bit of the channel bits shown in FIGS. 10A and 10B. The bi-phase modulator 34 executes processes for adding and modulating the sync signal and generates the bi-phase signal as shown in FIGS. 10A and 10B. The bi-phase signal is supplied to the FM modulator 33 and is analog frequency modulated by using the carrier signal (84.672 kHz) from the frequency divider 32. The frequency modulation is performed in a manner such that, for example, when the data bit is equal to '0', a frequency deviation of −10% of the carrier frequency is caused and, when the data bit indicates '1', a frequency deviation of +10% of the carrier frequency is caused. Therefore, an average frequency of the FM modulation output is the carrier frequency (84.672 kHz). The guide grooves are formed on the disk by an output signal of the FM modulator 33.

The carrier frequency (84.672 kHz), the construction of the ADIP sector, and the sector frequency (288 Hz) when the ADIP data is recorded to the wobbling grooves indicate values in case of a data transfer speed at which 18 clusters (2) are recorded or reproduced for one second.

Figure 12:
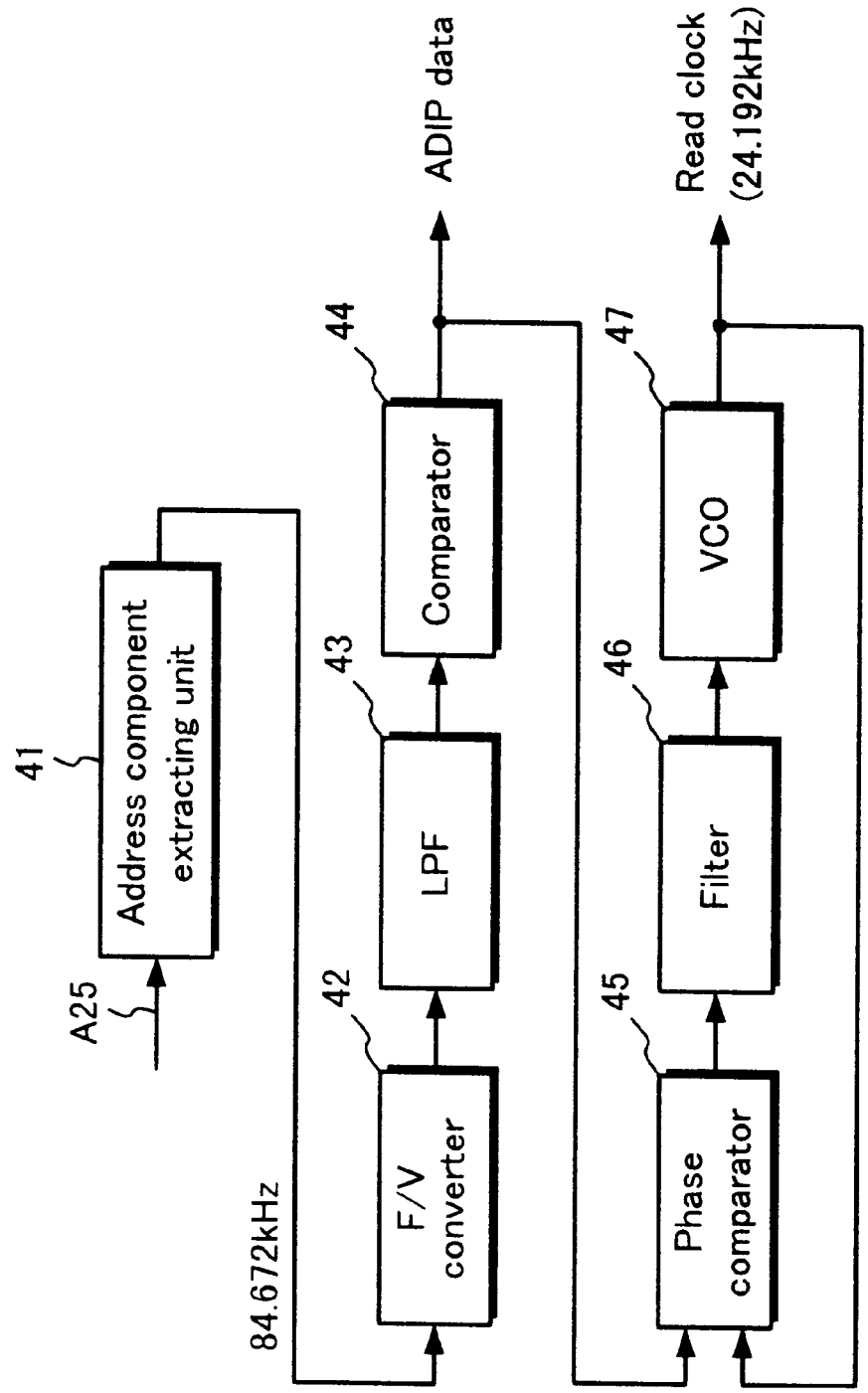
FIG. 12 is a block diagram showing an example of a construction for reproducing the physical address from a reproduction signal.

A construction to reproduce the physical address (ADIP) recorded as information of the wobbling grooves on the disk will now be explained with reference to FIG. 12. The construction is provided in the servo circuit 13 in the whole construction shown in FIG. 1. In FIG. 12, the reproduction signal A25 from the optical system 4 is supplied to an address component extracting unit 41. The extracting unit 41 is constructed by a band pass filter for separating a signal component mainly having the carrier frequency (84.672 kHz).

The address component from the extracting unit 41 is supplied to an F/V converter 42. The F/V converter 42 generates an output voltage according to the frequency of the input signal. An output signal of the F/V converter 42 is supplied to a low pass filter 43. The low pass filter 43 eliminates unnecessary signal components. An FM demodulation signal is generated from the low pass filter 43. An output signal of the low pass filter 43 is supplied to a comparator 44 and is compared with a predetermined threshold value. As an output of the comparator 44, a binary signal, namely, bi-phase modulated ADIP data is outputted. The ADIP data is outputted as a reproduction address.

The ADIP data from the comparator 44 is supplied to a phase comparator 45. A phase of the ADIP data is compared with that of an output of a VCO (voltage controlled oscillator) 47 by the phase comparator 45. An output signal of the phase comparator 45 is supplied as a control voltage to the VCO 47 via a filter 46. The filter 46 is a loop filter (low pass filter). A PLL is constructed by the phase comparator 45, filter 46, and VCO 47.

A clock (24.192 kHz) of the bi-phase modulation synchronized with the ADIP data is outputted from the VCO 47. The clock is used to read the reproduction ADIP data outputted from the comparator 44 by sampling. That is, the ADIP data and read clock are supplied to a data decoding unit (not shown). '1' and '0' of the data are discriminated at a timing of the read clock by the data decoding unit.

Figure 13:
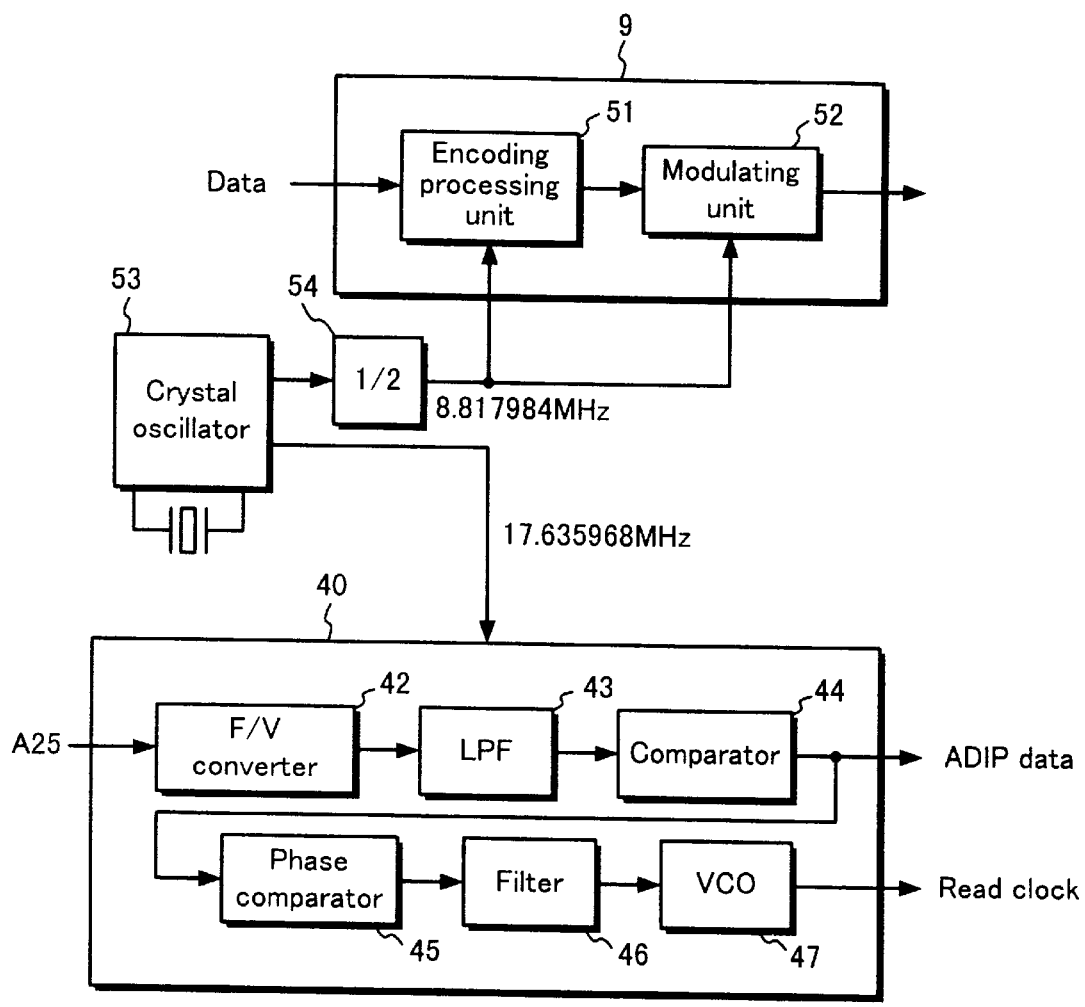
FIG. 13 is a block diagram for explaining a formation of a clock signal in an embodiment of the invention.

The relation between the frequency of the clock signal (first clock signal) necessary for the foregoing physical address processing unit and the frequency of the clock signal (second clock signal) necessary for the process in the modulating unit 9 to generate recording data will now be described with reference to FIG. 13. In FIG. 13, the modulating unit 9 is constructed by an encoding processing unit 51 and a modulating unit 52. As mentioned above, the encoding processing unit 51 executes the processes for setting the data to be recorded to the sector structure including the sync signal, constructing the cluster (1) from a plurality of sectors, and constructing the cluster (2) by adding the DSV bits to the cluster (1). The modulating unit 52 performs the modulation of RLL (1, 7). The above-mentioned physical address reproduction processing unit constructed by the FM demodulating unit and PLL is shown by reference numeral 40 in FIG. 13.

As mentioned above, the total number of channel bits of the cluster (2) is equal to (2268×216=489,888 channel bits). In order to transfer 18 clusters for one second, it will be understood that the clock signal of a frequency of (489,888× 18=8.817984 MHz) is needed. As shown in FIG. 13, therefore, an oscillator 53 which is constructed by a crystal oscillator or the like and has an oscillating frequency of 17.635968 MHz is provided as an original oscillator. A frequency of an output signal of the oscillator 53 is divided by a 1/2 frequency divider 54. The clock signal of 8.81798 MHz can be obtained from the 1/2 frequency divider 54. The clock signal is used for the signal process in the encoding processing unit 51 and modulating unit 52 of the modulating unit 9.

On the other hand, an output of the oscillator 53 is used for the signal process in the physical address processing unit 40. When a frequency of the output signal of the oscillator 53 is divided into 1/729, the frequency of (17.635968 MHz/729=24.192 kHz) is obtained. The frequency is the same as that of the read clock generated by the physical address reproduction processing unit 40.

When all of the modulating unit 9 shown in FIG. 1 (or FIG. 13) and the physical address processing unit 40 of the construction shown in FIG. 12 (or FIG. 13) are constructed by the digital signal processes, the above-mentioned frequency relation means that the clock signal which is necessary for both of them can be generated by simple hardware. In other words, if one clock is prepared as an original oscillation, the process for the signal to be recorded to the disk and the reproducing process of the physical address data previously formed on the disk can be simultaneously executed by using such a clock.

Figure 14:
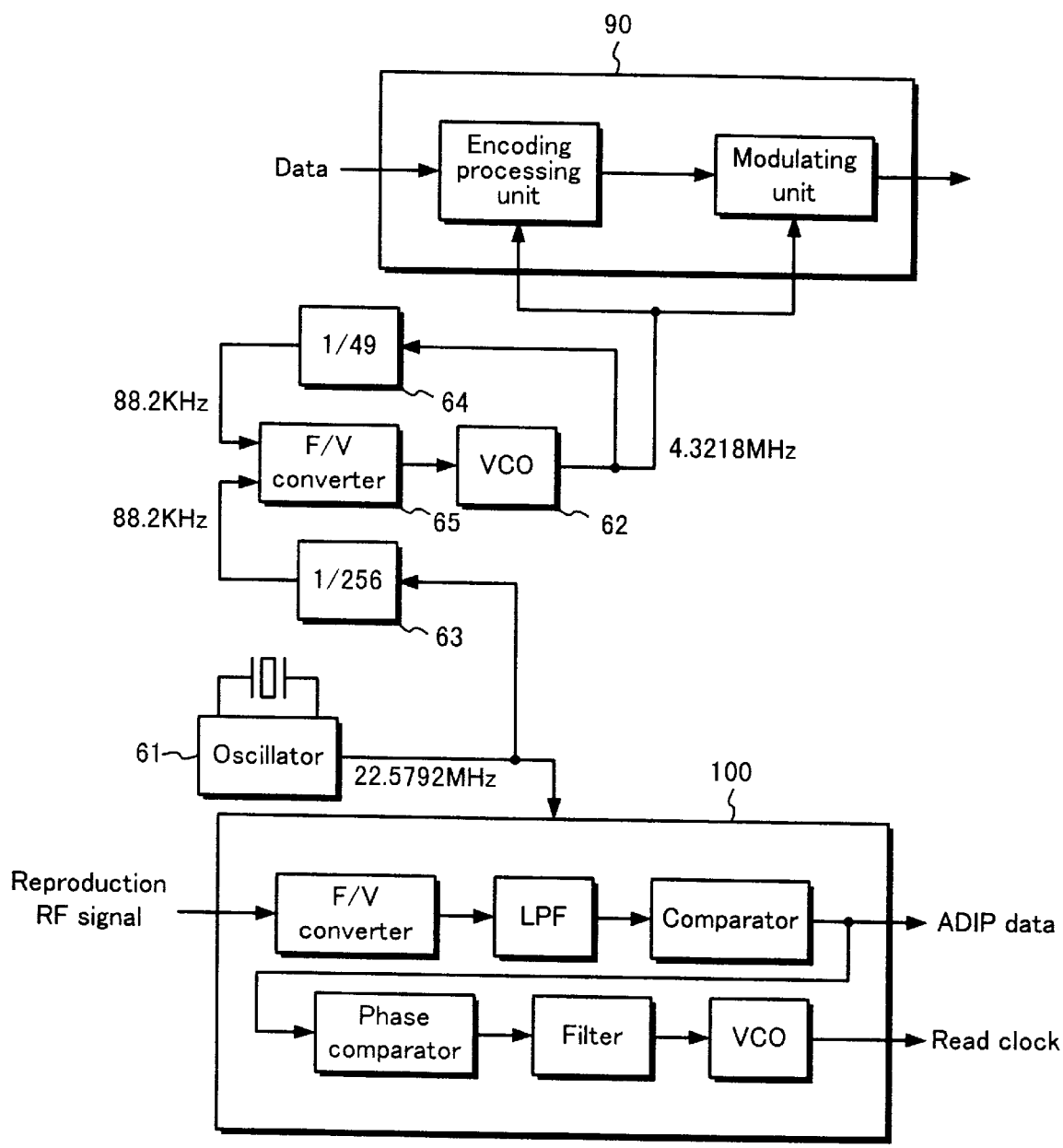
FIG. 14 is a block diagram for explaining a formation of a clock signal in a mini disk.

In order to further clarify advantages of the invention, a construction of a conventional optical disk apparatus [specifically speaking, a mini disc (MD)] is shown in FIG. 14. In FIG. 14, reference numeral 90 denotes a modulating unit for forming a recording signal to the mini disc and 100 indicates a physical address reproduction processing unit for frequency demodulating a reproduction RF signal, generating ADIP data, and generating a clock to read the ADIP data by the PLL. The modulating unit 90 and physical address reproduction processing unit 100 are similar to those in the embodiment of the invention. As a modulating system, an EFM modulation is used in the mini disc.

In FIG. 14, reference numeral 61 denotes an oscillator as an original oscillation. A frequency of an output of the oscillator 61 is equal to 22.57792 MHz. The output of the oscillator 61 is used as a clock for processing in the physical address reproduction processing unit 100. The clock frequency necessary for the modulating unit 90 is equal to 4.3218 MHz (channel bit frequency) in consideration of a cluster size, a modulating system, and the like. Since the relation between those frequencies is not an integer ratio, the clock of the frequency necessary for the modulating unit 90 is formed by the PLL.

That is, the PLL is constructed by a VCO 62 having a center of 4.3218 MHz, frequency dividers 63 and 64, and a phase comparator 65. The VCo 62 generates a clock signal of a frequency of 4.3218 MHz which is necessary for the process of the modulating unit 90. A frequency of an output of the VCO 62 is divided into 1/49 by the frequency divider 64 and is set to a signal of a frequency of 88.2 kHz. An output of the frequency divider 64 is supplied as one input signal of the phase comparator 65. As another input signal of the phase comparator 65, a signal of a frequency of 88.2 kHz obtained by dividing a frequency (22.5792 MHz) of an output signal of the oscillator 61 into 1/256 is supplied. Therefore, the VCO 62 of the PLL generates a clock signal of 4.3218 MHz synchronized with the output signal of the oscillator 61.

As will be understood from FIG. 14, if the relation between the frequency of the clock signal necessary for the modulating unit and the frequency of the clock signal necessary for the physical address processing unit is not the integer ratio, it is necessary to provide the PLL in order to generate the clock signal of the necessary frequency. As will be obviously understood when comparing FIGS. 13 and 14, in the embodiment of the invention, since the frequency of the first clock signal necessary for the physical address processing unit 40 is set to the value that is twice as high as the frequency of the second clock signal necessary for the modulating unit 9, the necessary first and second clock signals can be formed by a simple construction comprising the oscillator 53 and 1/2 frequency divider 54 (constructed by a flip-flop). When the VCO having an analog circuit construction is used as shown in the example of FIG. 14, problems such as increase in electronic power consumption, high frequency noise interference to the outside, instability or the like due to an aging change and a temperature change, and the like occur. In the invention, the above problems do not occur.

The above-mentioned values of the frequencies in the embodiment of the invention are shown as examples and the other frequency values can be also used. That is, it is sufficient that the relation between the frequency of the clock signal necessary for the modulating unit of the recording data and the frequency of the clock signal necessary for the physical address reproduction processing unit is set to the integer ratio.

The invention can be also applied to a recordable optical disk, for example, an optical disk of a phase-change type besides the magnetooptic disk.

The present invention is not limited to the foregoing embodiment but many modifications and variations are possible within the purview of the invention without departing from the essence of the invention.

As mentioned above, according to the invention, by properly setting the number of bits in the DSV control bits which are inserted into the cluster as a unit for the rewriting, the relation between the frequency of the first clock signal necessary for the physical address processing unit and the frequency of the second clock signal necessary for the modulating unit can be set to the integer ratio. Consequently, the necessary first and second clock signals can be formed by the simple construction comprising the common oscillator and frequency divider.

Having described a specific preferred embodiment of the present invention with reference to the accompanying drawings, it is to be understood that the invention is not limited to that precise embodiment, and that various changes and modifications may be effected therein by one skilled in the art without departing from the scope or the spirit of the invention as defined in the appended claims.

What is claimed is:

1. An optical disk apparatus in which address information is previously recorded and data is recorded to an address shown by said address information, characterized in that said apparatus comprises:

modulating means for converting recording data into a data structure having a predetermined format and modulating data having said predetermined format;

recording means for recording the recording data from said modulating means onto an optical disk; and address reproduction processing means for reproducing said address information from a reproduction signal from said optical disk, and that in said modulating means, the number of bits of DSV control bits which are inserted into the modulation data is set so that a ratio between a frequency of a first clock signal which is used in said address reproduction processing means and a frequency of a second clock signal which is used in said modulating means is equal to an integer ratio.

2. An optical disk apparatus according to claim 1, characterized in that said address information is recorded so as to be included in a wobbling signal component of wobbling grooves which are previously formed on the optical disk.

3. An optical disk apparatus according to claim 1, characterized in that said first clock signal and said second clock signal are formed from an output of a common clock oscillator.

4. An optical disk apparatus according to claim 1, characterized in that said DSV control bits are inserted at regular intervals in data of one rewriting unit.

5. An optical disk apparatus according to claim 4, characterized in that said data which i s recorded on said optical disk has a structure of a sync signal and a sync frame in which a predetermined amount of data follows after that, and one rewriting unit is constructed by a plurality of said sync frames.

6. An optical disk apparatus according to claim 5, characterized in that said one sync frame consists of 1,116 channel bits and the DSV control bits of three bits are inserted every 186 channel bits.

7. An optical disk apparatus according to claim 5, characterized in that when the DSV control bits are inserted into said sync frame, an inserting position of said DSV control bits is set to a position just after said sync signal.

8. A data recording method of previously recording address information and recording data to an address shown by said address information, characterized in that said method comprises:

a step of converting recording data into a data structure having a predetermined format and modulating data having said predetermined format;

a step of recording the recording data generated by said modulation onto an optical disk; and a step of an address reproducing process for reproducing said address information from a reproduction signal from said optical disk, and that in said data modulating step, the number of bits of DSV control bits which are inserted into the modulation data is set so that a ratio between a frequency of a first clock signal which is used in said address reproduction processing step and a frequency of a second clock signal which is used in said modulating step is equal to an integer ratio.

* * * * *